April 21, 1970 — G. F. RUEGSEGGER — 3,507,016
MACHINE FOR MAKING CONCRETE PIPES
Filed May 9, 1967 — 5 Sheets-Sheet 1

Inventor
Glenn F. Ruegsegger
By Andrew O. Riteris
Attorney

April 21, 1970   G. F. RUEGSEGGER   3,507,016
MACHINE FOR MAKING CONCRETE PIPES
Filed May 9, 1967   5 Sheets-Sheet 3

Inventor
Glenn F. Ruegsegger
By Andrew O. Riteris
Attorney

April 21, 1970 G. F. RUEGSEGGER 3,507,016
MACHINE FOR MAKING CONCRETE PIPES
Filed May 9, 1967 5 Sheets-Sheet 4

Inventor
Glenn F. Ruegsegger
By Andrew Olstein
Attorney

1

United States Patent Office 3,507,016
Patented Apr. 21, 1970

3,507,016
MACHINE FOR MAKING CONCRETE PIPES
Glenn F. Ruegsegger, 3447 W. North Union,
Bay City, Mich. 48706
Filed May 9, 1967, Ser. No. 637,190
Int. Cl. B28b 21/24, 21/10
U.S. Cl. 25—36           11 Claims

ABSTRACT OF THE DISCLOSURE

The tile machine is essentially comprised of an arc-shaped stationary frame, a vertically reciprocally movable head frame, and a rotatable turntable. The turntable is provided with two rows of multiple tile molds. The head frame is provided with one row of packer heads which are aligned with one of the rows of molds and with another row of push-out rods which are in turn aligned with the other row of molds. A conveyor is provided to feed concrete to half cylinder shaped funnels which are provided over the first row of molds.

BACKGROUND OF THE INVENTION

The field of the invention encompasses concrete drain tile making machines and particularly machines of this type which are capable of automatically making several tiles at one time and of automatically placing the formed tile on a pallet.

The prior art in this field is fairly crowded. Many attempts at producing automatic drain tile machines have been made, but the equipment actually employed by the drain tile manufacturers prior to this invention has remained virtually unchanged for decades. Simultaneous molding of tile by several packer heads which reciprocate in unison has been suggested as early as 1914 by Gillard 1,116,080, who proposed several packer heads which descend into a row of molds in similar fashion as in the present invention. After the tile was formed the dies were opened along a vertically extending seam and the die was "peeled" off the formed tile. The tile was positioned on a pallet which had been placed underneath the molds. In recent years, suggestions have been made to divide the molds into two independent half-sections which could be pulled apart in a vertical direction to permit the tile to be placed on a pallet (Dennis et al. 3,176,369 and Burdette 3,032,853). However, these suggestions have not been successful since vertical separation of the half sections has tended to crack the newly formed tile.

The mold design actually employed prior to the present invention has predominantly been a fairly thin-walled cylinder which can be opened along a vertical seam and peeled off the formed tile by flexing sidewalls of the mold outwardly. A vertically extending hinge has been often provided at the side opposite the seam to permit wider spreading apart of the mold sidewalls. Simultaneous molding in several molds of this type while the molds are maintained in a turntable has been suggested by Parker 2,467,631.

SUMMARY

The primary object of this invention is to provide a fully automatic drain tile making machine which is capable of making several tiles simultaneously and of placing such tiles on a pallet.

To attain this object the method of material conveyance to the tile molds must be such that the molds will be repeatedly and consistently supplied with the proper amount of material. This problem is solved in the disclosed machine by delivering excess wet concrete to the funnels from which the concrete is moved by the packer heads and by gravity into the molds. The design of the delivery system is such that the concrete is expended from the funnels in the time order to its delivery thereto, thereby avoiding batches of concrete which might dry or harden.

Further, to attain the primary object, the method of tile removal must be such that it lends itself to automatic ejection within the time period required to form the tile. This problem is solved in the disclosed machine by providing straight walled cylindrical molds and by ejecting the tile therefrom by pushing the tile axially downwardly by push rods which travel downwardly at the same speed as a pallet which is positioned below the molds.

In addition to the above features, the primary object of this invention is attained by coordinating molding, ejection and pallet pick-up functions in such a manner as to require only one vertical reciprocal cycle of the head frame to produce one row of tiles.

DESCRIPTION OF DRAWINGS

Other objects and advantages will be pointed out in, or be apparent from the description and claims, as will obvious modifications of the embodiment shown in the drawings, in which:

Figure 2:
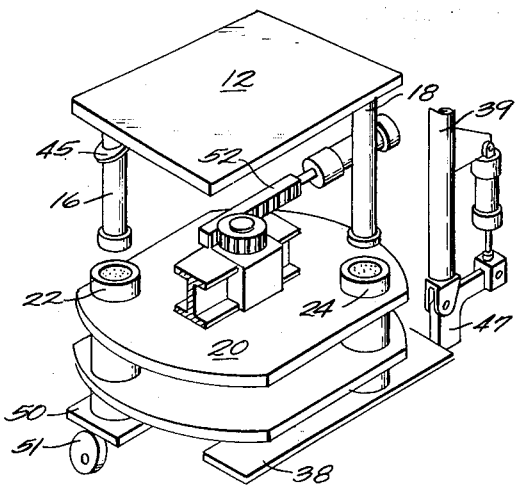
FIG. 2 is a similar schematic view showing the turntable after it has been rotated through 180°.

The basic components of the drain tile molding machine may be divided into the following basic elements: an arc-shaped main frame 10;

a head frame 12 which is mounted for vertically reciprocal sliding movement on guide rods 14 and which carries a row of packer heads 16 and an equal row of push-rods 18;

a turntable 20 which is fixed at a vertical position to the main frame and which carries two parallel rows of molds 22 and 24;

a concrete delivery mechanism 26 which delivers wet concrete from a fairly large hopper 28 via a conveyor 30 to several funnels 34; and a pallet conveyor 36 which travels through the arc of the main frame and delivers empty pallets 38 to a location at which pallet pick-up members 39 (fixed to the head frame 12) elevate the pallets to a position just below the second row of molds and again deposit them on the conveyor after tile has been placed on the pallets.

The concrete delivery mechanism 26 is generally at a fixed position in respect to the frame 10 and the turntable 20. The hopper 28 has vertically extending smooth sidewalls and its bottom is formed by the feed conveyor 30 which delivers wet concrete to the half cylinder shaped funnels 34. A rotating shaft 40 having comb teeth 41 at the dividing line between each of the funnels is provided to divide the delivered concrete evenly between the compartments as well as to agitate the concrete within the funnels in such a manner as to push the concrete at the top of the mass within the funnels towards the bottom. The teeth are preferably of helical design so as to alternatively push concrete towards one of two adjacent funnels. A stationary comb backing 42 is provided at the underside of the conveyor 30 to scrape the bottom thereof and to guide the concrete in that area towards the molds. A vertically adjustable metering gate 43 is provided to vary the amount of concrete delivered to the funnels.

Figure 1:
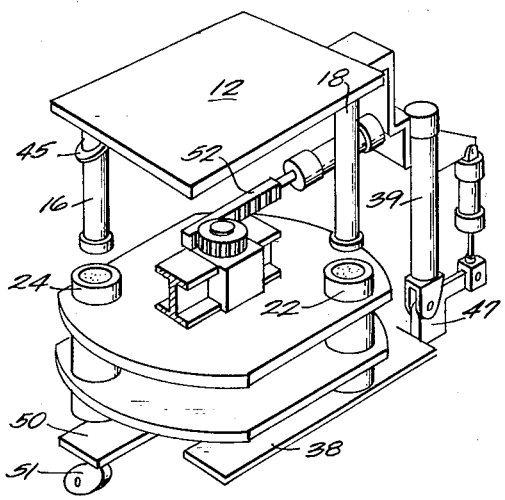
FIG. 1 is a schematic perspective view of the tile molding machine with the parts being in a position immediately after the completion of the cycle in which the tiles in one row of molds have been made and the tiles in the other row of molds have been ejected, the number of molds in each row being reduced for the sake of clarity.
Figure 3:
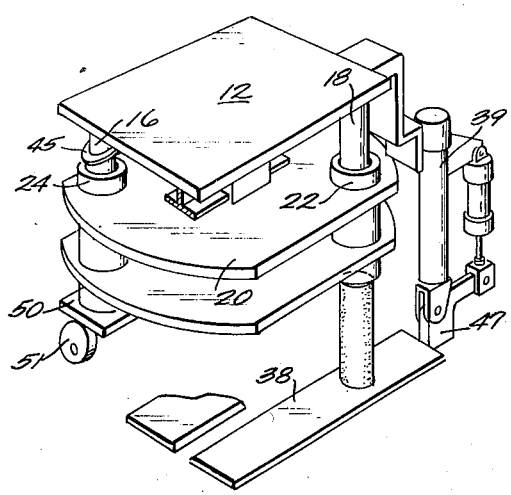
FIG. 3 is a similar schematic view showing the head frame in its lowermost position.
Figure 4:
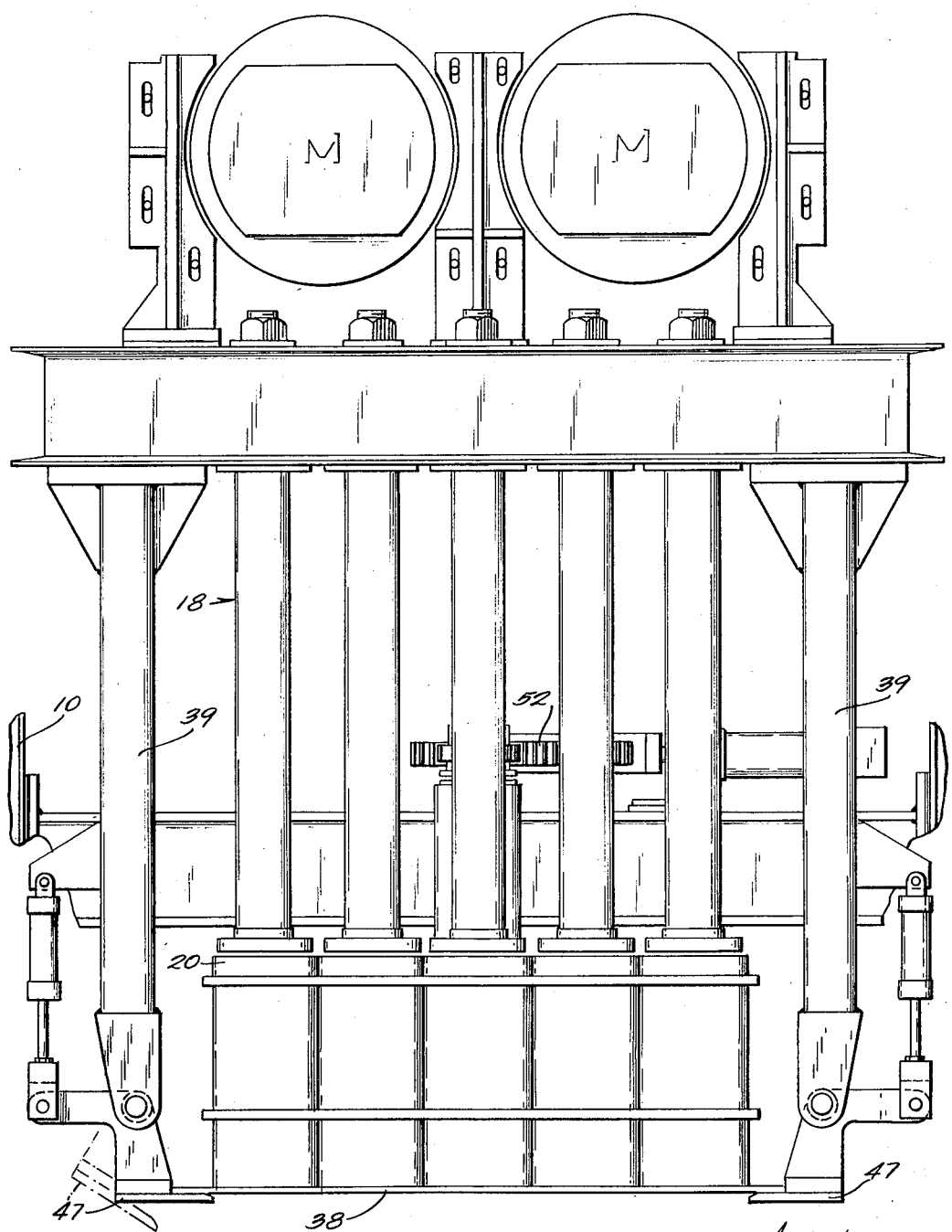
FIG. 4 is a side view of the tile molding machine with the head frame being in its uppermost position.
Figure 5:
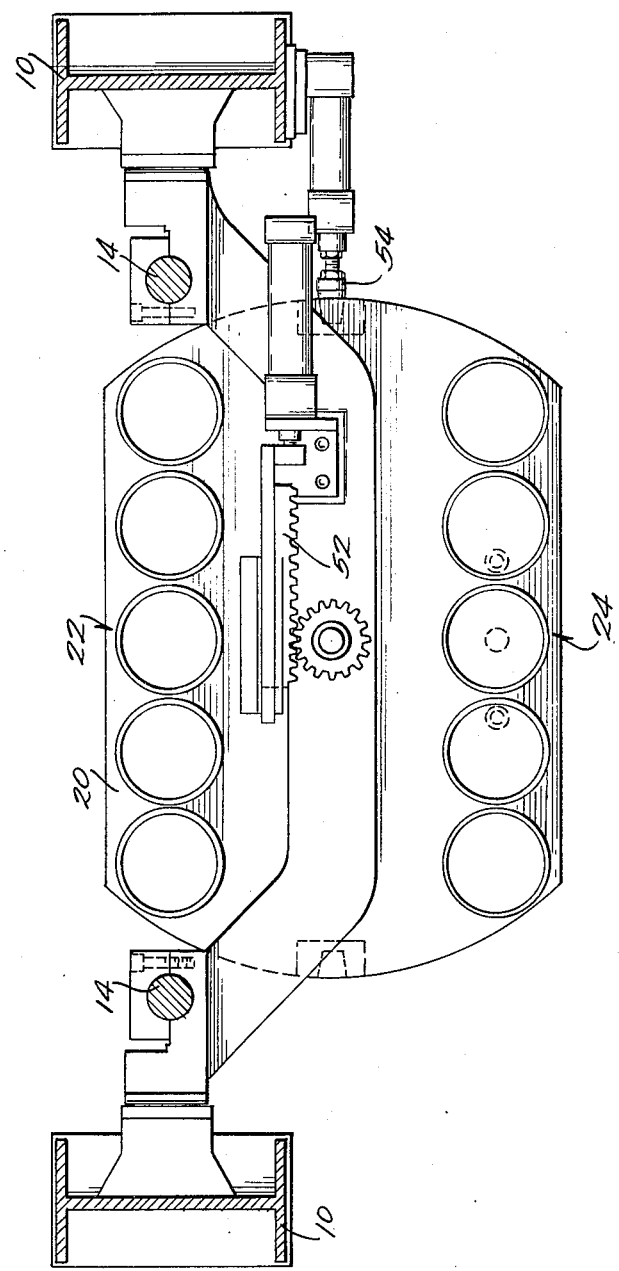
FIG. 5 is a top view of the turntable.
Figure 6:
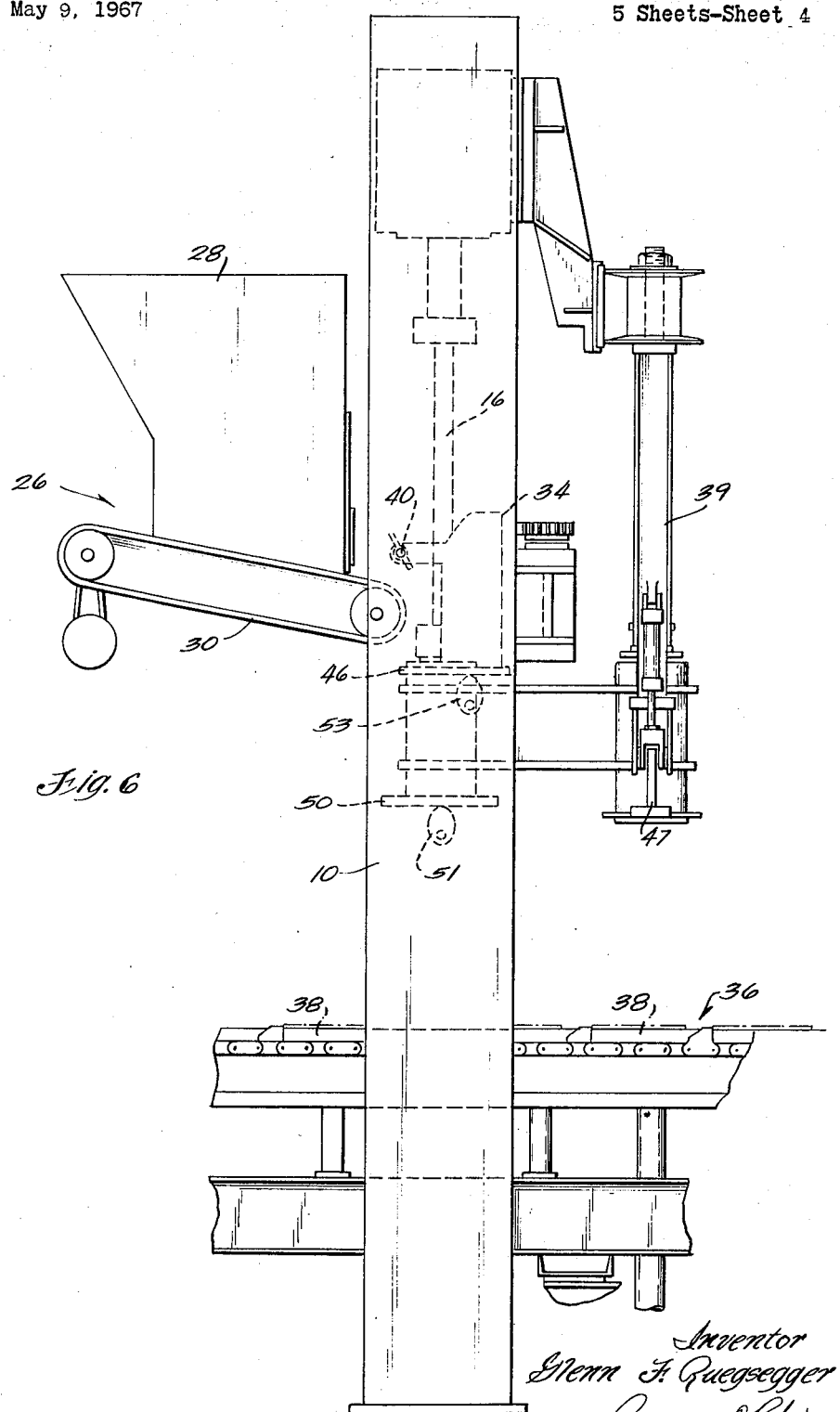
FIG. 6 is a front plan view of the push-out rods and the turntable.
Figure 8:
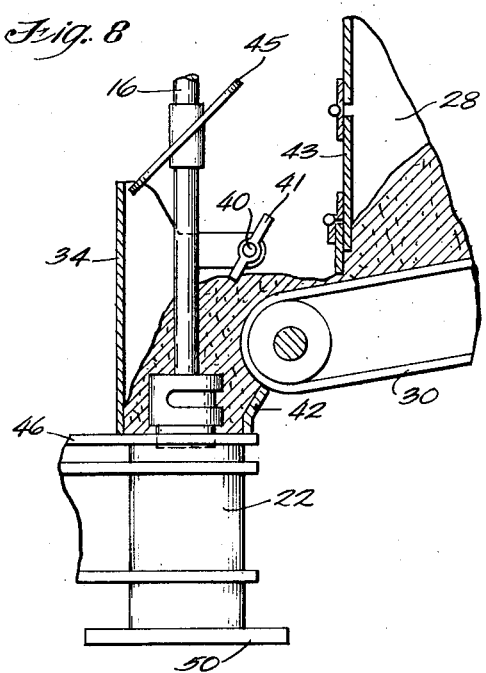
FIG. 8 is a side view thereof with the packer head being shown in its uppermost position.
Figure 9:
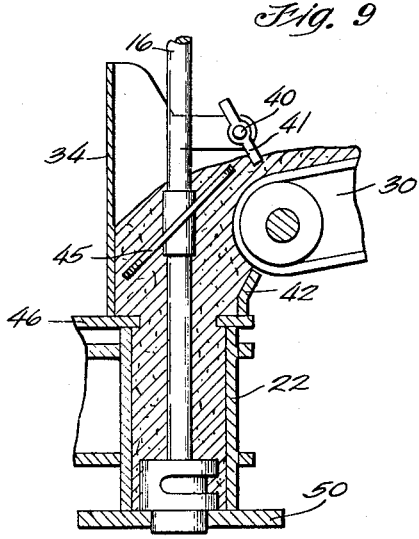
FIG. 9 is a similar view to FIG. 8 showing the packer head in its lowermost position.
Figure 7:
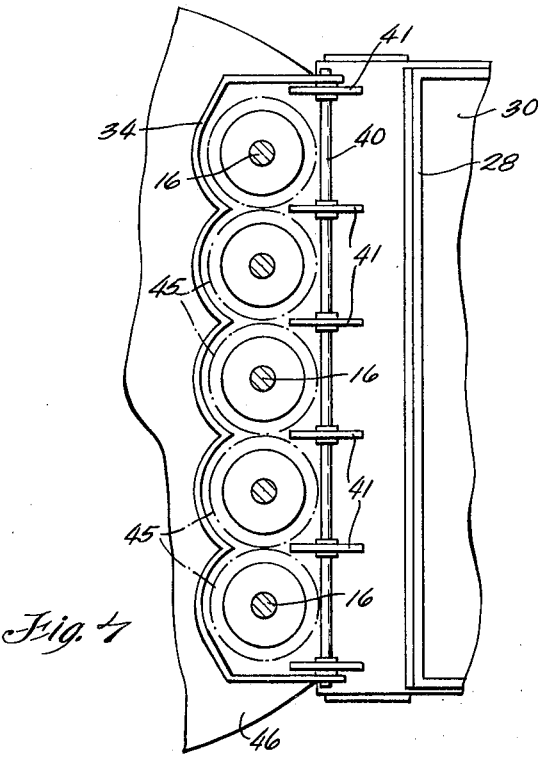
FIG. 7 is a top plan view of the feed conveyor and funnel sections.
Figure 10:
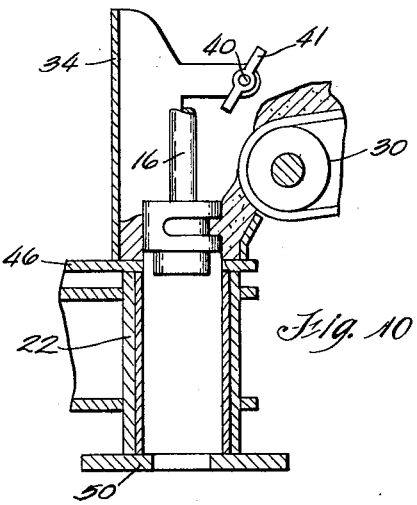
FIG. 10 is a similar view after the tile has been formed.

When the head frame 12 is in its uppermost position (FIG. 1 and FIG. 8) a certain amount of wet concrete is present within each funnel. This amount may be controlled by a sensing device (not shown) which stops the delivery conveyor travel whenever the required amount is reached, or the metering gate may be adjusted to such a level that after the predetermined amount of concrete has accumulated within the funnels, the concrete offers sufficient resistance to cause slippage between the delivery belt of the conveyor and the concrete within the hopper, thus hindering further delivery.

With the funnels being filled as described above, the head frame moves downwardly with the packer heads 16 being rotated in the known manner. As the packer heads reach the bottom of the molds 22 the slinger wings 45 enter the funnels and propel the concrete stored therein downwardly into the mold where the packer head, while dwelling momentarily at the bottom of the mold, forms the bottom portion of the tile. At this time and during the subsequent upward movement of the head frame and packer heads more concrete is delivered to each funnel. The concrete delivered during this time falls through the top die plate 46 into each mold thus feeding the mold during the upstroke of the packer heads. As the packer head returns to its topmost position, it pushes the excess of the concrete delivered to the mold into the funnels. Since this excess necessarily is located at the bottom of the concrete mass within the compartment it will be the first to enter the mold during the next downward movement of the packer head.

During the heretofore described cycle of the molding operation, the freshly formed tiles of molds 24 have been simultaneously ejected and placed on a pallet 38 and another pallet has been picked up and elevated to a vertical position just below the lower edge of the molds 24 and 22.

At the start of the heretofore described cycle the pusher rods 18 enter each mold 24. The pallet 38 which is held below the molds by hooks 47 of pick-up members 39 moves downwardly at the same rate and thus the freshly formed tile is gently guided out of the molds and positioned in an upstanding position on the pallet. At the lowermost position the pallet is positioned on the conveyor 36, the hooks are moved outwardly to release the pallet, the conveyor advances by the length of one pallet space, and the hooks are again moved inwardly to grip the next pallet and to convey it upwardly on the return stroke of the head frame. The control mechanisms for actuating and timing the hooks and the conveyor are of known designs and are therefore not described or shown.

After the heretofore described cycle the head frame 12 is at its uppermost position and molds 22 contain formed tiles while molds 24 are empty. At this point, the bottom die plate 50 is dropped (by movement of cam 51) and the top die plate 46 moves up in unison so as to provide some clearance between the bottom molds and die plates of molds 22 and the die plates. Immediately thereafter the turntable 20 is rotated through 180° by movement of the rack and pinion 52 and 53 to thereby bring the empty molds 24 in alignment with the packer heads and to bring the full molds in alignment with the pushout rods 18.

After the 180° movement the die plates are moved against the top and bottom of the molds 22 and the turntable is fixed by an indexing pin 54. Although the formed tiles in the molds 22 are not supported at the bottom during the rotation of the turntable, the adhesion of the wet concrete to the sidewalls of the molds is sufficient to prevent downward slippage of the tile.

Although but one embodiment of the present invention has been illustrated and described, it will be apparent to those skilled in the art that various changes and modifications may be made therein without departing from the spirit of the invention or from the scope of the appended claims.

I claim:

1. In an automatic concrete pipe molding machine of the type having vertically reciprocally movable packer means which enter vertically extending molds and which, upon being supplied with wet concrete, are capable of molding a concrete pipe within such molds during a reciprocal lineal movement within such molds, and having a turntable which carries a plurality of such molds and permits one or more of such molds to be selectively placed in alignment with said packer means while permitting the other molds to be free to permit removal of previously formed pipe, the combination of:

push-out means connected to said packer means for vertical reciprocal movement therewith and located in such a manner as to be in vertical axial alignment with those molds of the turntable which are not in axial alignment with the packer means;

said packer means and push-out means being simultaneously movable from a position above the molds downwardly into the molds and thereafter upwardly to said first mentioned position;

a bottom die plate positioned below those molds which are aligned with said packer means and being movable to a position in contact with the bottom faces of such molds to provide a bottom mold surface for the tile to be molded, said bottom die plate being movable to a position away from such contacting position to avoid interference with the removal of the formed tile from said molds;

means positioning a pallet beneath and close to those molds which are in said alignment with said push-out means, said pallet positioning means being so coordinated with said packer and push-out means as to travel downwardly, while holding such pallet, at the same speed as said packer and push-out means;

the side walls of said molds being smooth and permitting the pipes formed therein to be removed from the molds upon the downward movement of said push-out means which enters said molds and causes the pipes to slide out downwardly while being supported on the simultaneously downwardly moving pallet; and motor means operable to move said bottom die plate towards and away from said contacting position and to rotate said turntable to thereby align those molds in which tile has been formed with said push-out means and to align those molds from which tiles have been removed with said packer means.

2. An automatic concrete pipe molding machine according to claim 1 in which said pallet positioning means includes pivotal hook means which is operable to extend beneath the pallet to support it and which may be pivoted away from such supporting position to release the pallet near the end of the downward movement of said push-out means.

3. An automatic concrete pipe molding machine according to claim 2 including conveyor means so positioned below said turntable as to permit said pallet positioning means to place a pipe loaded pallet on said conveyor means near the end of said downward head frame movement, and said conveyor means being operable to advance a sufficient distance after said placement of said pipe loaded pallet so as to permit said hook means to engage the bottom surface of an empty pallet carried by said conveyor and to lift it upwardly to said close position in respect to said molds during the successive upward movement of said main frame.

4. An automatic concrete pipe molding machine according to claim 1 including concrete delivery means positioned to deliver concrete to those molds which are in alignment with said packer means, said concrete delivery means cooperating with stationary funnel means positioned above those molds which are in alignment with said packer means; and concrete conveying means operable to deliver wet concrete from a hopper to said funnel means.

5. An automatic concrete pipe molding machine according to claim 4 wherein said funnel means is comprised of several adjacent half-cylinder sections with each section being positioned above one of said aligned molds and wherein said concrete delivery means further includes a rotating shaft having radially extending projections with said shaft being positioned in the path of the concrete at a position immediately before its delivery to said funnel sections, and with said projections being shaped to substantially evenly divide said delivered concrete between said several half-cylinder sections.

6. An automatic concrete pipe molding machine according to claim 5 having a stationary main frame and a vertially reciprocally movable head frame mounted on said main frame; with said packer means, push-out means and said pallet positioning means being connected to said head frame to thereby attain simultaneous vertical reciprocal movement of said three last mentioned means.

7. An automatic concrete pipe molding machine according to claim 6 including a top die plate positioned below said funnel means and adjacent to the top surfaces of those molds which are in alignment with said packer means, said top die plate being movable into contact with the top surfaces of said molds during the molding operation and moving away from said surfaces during rotation of said turntable.

8. An automatic concrete pipe molding machine according to claim 1 including a top die plate being movable to a position in contact with the top faces of those molds which are aligned with said packer means to provide a top mold surface of the tile to be formed and movable to a position away from such contacting position to avoid interference with the removal of the formed tile from said molds.

9. An automatic concrete pipe molding machine according to claim 8 wherein said bottom and top die plates are fixed for limited vertical movement to a main frame of the machine and wherein both of said die plates are moved by said motor means into contact with said mold surfaces as said turntable has turned to align empty molds with said packer means and wherein said die plates are moved by said motor means away from said contacting positions after the tile has been molded and before said turntable is rotated to align the filled molds with said push-out means.

10. An automatic pipe molding machine according to claim 1 wherein said machine inclues an arc-shaped, stationary main frame and wherein said packer and push-out means are mounted on a head frame which is carried for vertically reciprocal movement by said main frame with said packer and push-out means being positioned in opposite rows which extend transversely to the arc of said main frame;
   said turntable containing two oppositely positioned rows of molds with one row being in alignment with said packer means and with the other row being in alignment with said push-out means; and
   pallet conveying means extending through the arc of said main frame and conveying pallets to said pallet positioning means with said pallets extending transversely to the arc of said main frame.

11. An automatic pipe molding machine according to claim 10 wherein said bottom die plate is mounted on said main frame for limited vertical motion to permit said movement towards and away from said bottom surfaces of said molds.

References Cited

UNITED STATES PATENTS

| | | | |
|---|---|---|---|
| 1,921,003 | 8/1933 | Romie | 25—41 |
| 2,467,631 | 4/1949 | Parker | 25—36 |

WILLIAM J. STEPHENSON, Primary Examiner

U.S. Cl. X.R.

25—30